United States Patent Office 3,459,543
Patented Aug. 5, 1969

3,459,543

SUPERCONDUCTING DEVICE

Jean Mueller, Geneva, Switzerland, and Ernst Bucher, Murray Hill, N.J., assignors to Ciba Limited, Basel, Switzerland No Drawing. Filed July 26, 1966, Ser. No. 567,816
Claims priority, application Switzerland, Sept. 1, 1965, 12,228/65
Int. Cl. C22c *25/00*
U.S. Cl. 75—150 2 Claims

ABSTRACT OF THE DISCLOSURE

Devices are provided which have superconductive properties at temperatures up to 10° K., which are formed of an alloy of 90–99.5 atom percent of beryllium and 10–0.5 atom percent of rhenium.

Superconducting materials have for some time gained importance for various electrotechnical applications, for example for the construction of superconducting magnets or superconducting switch units. The interest in superconductivity has from a technical point of view been promoted by two main reasons:

(1) By the advances in cryotechnics, as a result of which the production of the requisite low temperatures no longer represents a serious obstacle;

(2) By the discovery of alloys and compounds having physically favourable superconductivity properties.

Hitherto alloys and compounds of the transition metals, such as for example Nb-Zr, Nb-Ti, $Nb_3Sn$, have almost exclusively been used in applications of superconductivity. Up to the present no alloy consisting mainly of nontransition metals has become known as a superconductor whose critical temperature ($T_c$) reaches about 10° K. This order of magnitude of $T_c$ is however necessary for many applications of a superconductor.

It has now been found that alloys consisting mainly of beryllium have superconducting properties. The subject of the present invention is therefore a superconducting device having superconductivity at a temperature up to 10° K. which comprises as superconductor alloys consisting mainly of beryllium as superconductors. Alloys of beryllium and rhenium are particularly suitable. Alloys consisting of 90 to 99.5 atom percent of beryllium and 0.5 to 10 atom percent of rhenium are preferably used. It is furthermore possible to alloy small amounts of further metals or elements with the two alloy metals. Particularly advantageous alloys contain about 2 atom percent of rhenium. In the quenched state $T_c$ has a maximum at 9.8° K. for about 2 atom percent of rhenium, whilst in the annealed state this maximum is displaced to somewhat higher rhenium concentrations. X-ray investigations have shown that the phase which mainly participates corresponds to the composition $Be_{22}Re$.

The following table shows further alloys which may be used according to this invention.

| | $T_c$ (° K.) |
|---|---|
| $Be_{96}$, $Re_{3.5}$, $Os_{0.5}$ | 9 |
| $Be_{96}$, $Re_2$, $W_2$ | 8.5 |
| $Be_{96}$, $Re_3$, $W_1$ | 9 |
| $Be_{22}$, Mo | 2.5 |
| $Be_{22}$, Tc | 5.2 |
| Be with 5 to 30% Nb | 2–3 |
| Be+33% Rh | 1–2 |
| Be+33% Ru | 1–2 |

As compared to known superconductors the new superconductors are distinguished by their low density (about 3 g. per cm.³ in the middle range of high $T_c$). Furthermore they are distinguished by exceptionally low specific heat, as has been shown by calorimetric measurements at low temperatures, namely in the case of $Be_{0.96}Re_{0.04}$ a coefficient of specific electron heat $\gamma=0.57\cdot10^{-3}$ Joule/mol ° $K.^2$ and a Debye temperature of 880° K. This beryllium-rhenium alloy proves to have by far the highest Debye temperature, and therefore an extremely low lattice heat, amongst the superconducting alloys which have hitherto become known.

The application of the superconducting devices according to the invention takes place in a manner which is in itself known, e.g., in electrical switches or magnetic shields. They may be used with advantage in all cases where weight is important. The superconducting alloys are manufactured by the methods which are usual in alloy technology.

We claim:

1. A superconducting device having superconductivity at a temperature up to 10° K., consisting essentially of an alloy consisting essentially of 90–99.5 atom percent of beryllium and 10–0.5 atom percent of rhenium.

2. A device according to claim 1 which consists essentially of as the superconductor a beryllium-rhenium alloy having about 2 atom percent of rhenium, the main phase of which has the structure of $Be_{22}Re$.

References Cited

UNITED STATES PATENTS

| | | | |
|---|---|---|---|
| 2,193,364 | 3/1940 | Adamoli | 75—150 |
| 3,196,532 | 7/1965 | Swartz et al. | 148—133 |

RICHARD O. DEAN, Primary Examiner